(12) United States Patent
Lingenauber et al.

(10) Patent No.: US 10,309,415 B2
(45) Date of Patent: Jun. 4, 2019

(54) EXHAUST-GAS TURBOCHARGER

(75) Inventors: Robert Lingenauber, Frankenthal (DE); Frank Scherrer, Frankenthal (DE); Josef-Hans Hemer, Worms (DE); Michael Fischer, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 672 days.

(21) Appl. No.: 14/119,225

(22) PCT Filed: May 21, 2012

(86) PCT No.: PCT/US2012/038784
§ 371 (c)(1),
(2), (4) Date: Nov. 21, 2013

(87) PCT Pub. No.: WO2012/170188
PCT Pub. Date: Dec. 13, 2012

(65) Prior Publication Data
US 2014/0099196 A1    Apr. 10, 2014

(30) Foreign Application Priority Data
Jun. 6, 2011    (DE) .................. 10 2011 103 420

(51) Int. Cl.
*F04D 29/40*    (2006.01)
*F01D 25/24*    (2006.01)
*F02C 6/12*    (2006.01)
(Continued)

(52) U.S. Cl.
CPC .......... *F04D 29/403* (2013.01); *F01D 25/24* (2013.01); *F02C 6/12* (2013.01); *F01N 13/16* (2013.01);
(Continued)

(58) Field of Classification Search
CPC ...... F04D 29/403; F04D 29/4206; F04D 7/06; F01D 25/243; F01D 25/005
See application file for complete search history.

(56) References Cited

U.S. PATENT DOCUMENTS 7,074,009 B2 *   7/2006   Allmang ................. F01D 9/026
                                                               415/177
8,628,296 B2 *   1/2014   Grussmann ........... F01D 25/243
                                                               415/204
(Continued)

FOREIGN PATENT DOCUMENTS

EP        0207697 A1 *  1/1987   ............. C22C 38/60
EP        0207697 B1    9/1989
(Continued)

OTHER PUBLICATIONS

International Search Report and Written Opinion dated Dec. 6, 2012.
(Continued)

*Primary Examiner* — David E Sosnowski
*Assistant Examiner* — Cameron A Corday
(74) *Attorney, Agent, or Firm* — Eric L. Doyle; Stephan A. Pendorf; Patent Central LLC

(57) ABSTRACT

An exhaust-gas turbocharger (1) having a compressor housing (2); a turbine housing (3); and a bearing housing (4) which has a compressor-side flange (5) and which has a turbine-housing-side flange (6). The turbine-housing-side flange (6) is produced from a material which corresponds in terms of its mechanical and thermal properties to the material of the turbine housing (2).

7 Claims, 5 Drawing Sheets

Figure 1:
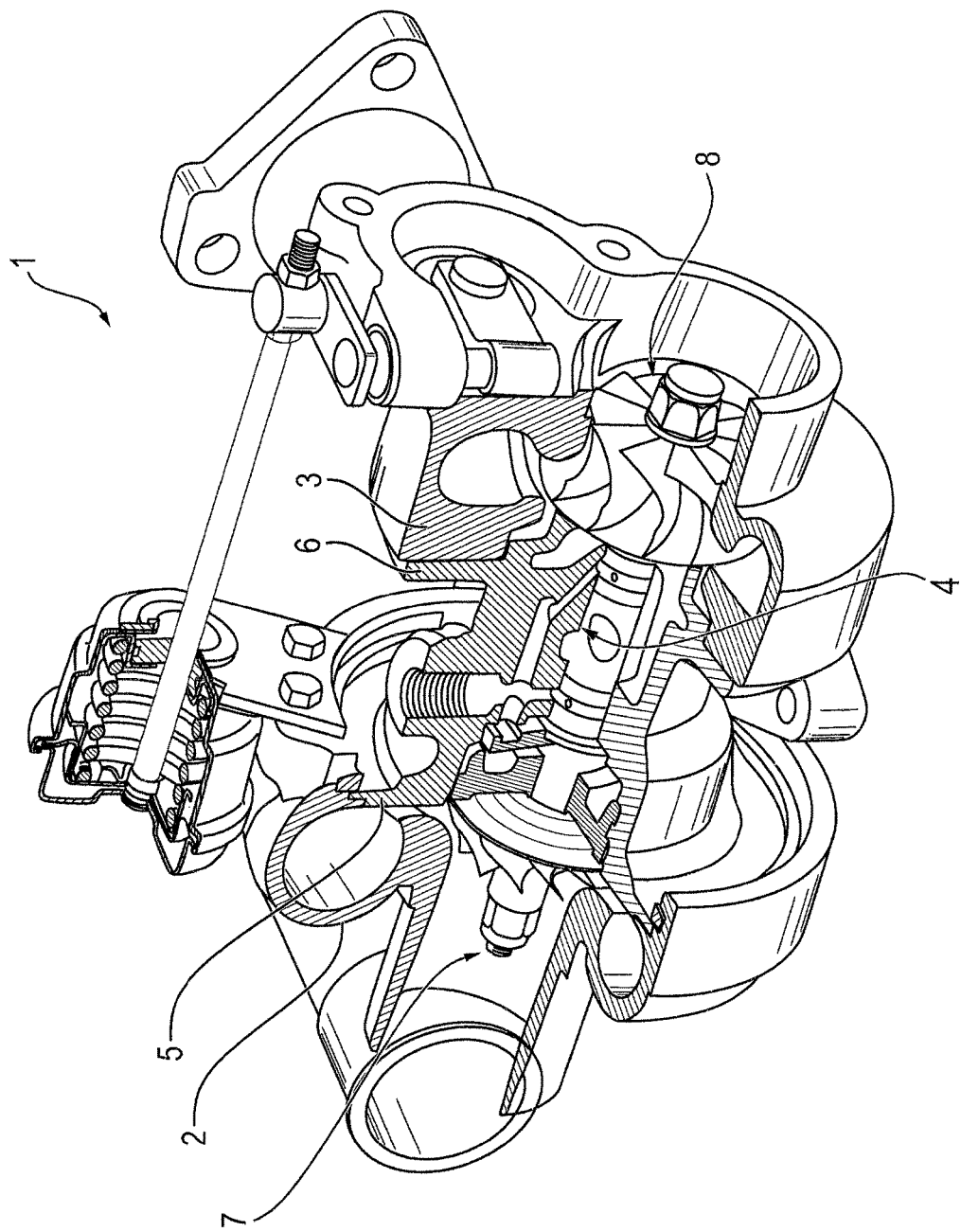

(51) Int. Cl.
   *F01N 13/16* (2010.01)
   *F02B 39/00* (2006.01)
(52) U.S. Cl.
   CPC .......... *F02B 39/00* (2013.01); *F05D 2220/40* (2013.01); *F05D 2300/171* (2013.01); *F05D 2300/50* (2013.01); *F05D 2300/502* (2013.01)

(56) References Cited

U.S. PATENT DOCUMENTS

| | | | |
|---|---|---|---|
| 2005/0011192 A1 | 1/2005 | Ohishi | |
| 2010/0054934 A1 | 3/2010 | Boening et al. | |
| 2010/0316494 A1* | 12/2010 | Gru mann | F01D 25/26 415/231 |
| 2011/0236191 A1* | 9/2011 | Grussmann | F01D 25/243 415/177 |
| 2014/0341732 A1* | 11/2014 | Friedrich | F01D 25/16 415/229 |

FOREIGN PATENT DOCUMENTS

| | | | | |
|---|---|---|---|---|
| EP | 1541826 A1 | 6/2005 | | |
| EP | 2299087 | * 3/2011 | | F02B 37/00 415/204 |
| JP | 05179406 A | 7/1993 | | |
| JP | 2010261365 A | 11/2010 | | |

OTHER PUBLICATIONS

Korean Office Action (with English language translation) dated Jan. 22, 2018, in Korean Application No. 10-2013-7034178.

* cited by examiner

EXHAUST-GAS TURBOCHARGER

The invention relates to an exhaust-gas turbocharger as per the preamble of claim 1.

An exhaust-gas turbocharger of said type has not only a compressor with a compressor housing, but also a turbine with a turbine housing which is fastened to a bearing housing via a bearing-housing-side flange. Here, an already known generic exhaust-gas turbocharger has a bearing housing produced from a material as a cast part.

Said cast material may be composed of a pearlitic microstructure which, when heated to over 450° C., begins to lose its structure because the pearlite breaks down into its constituent parts. Here, firstly, a change in volume of the material takes place and, secondly, the bearing housing loses its hardness (HB). Said loss of hardness may be so drastic that, specifically in conjunction with dendritic formation of the matrix of the material, significant crack formations may occur.

The bearing housing material is subjected to a very high temperature in particular at the contact surface or the fit with respect to the turbine housing, and is additionally subjected to mechanical loading by the clamping forces of the connecting elements. In conjunction with said loadings, the vibrations resulting from the engine running during use of the exhaust-gas turbocharger, and the different coefficients of expansion of the bearing housing and the turbine housing, said crack formation occurs in the bearing-housing-side flange, which results in a direct leakage of exhaust gas at the connecting point between the bearing housing and the turbine housing.

It is therefore an object of the present invention to provide an exhaust-gas turbocharger of the type specified in the preamble of claim 1, which exhaust-gas turbocharger makes it possible to minimize or eliminate the above-explained problems of the generic turbocharger.

Said object is achieved by means of the features of claim 1.

It is achieved by means of said features that the highly loaded contact region between the turbine housing and bearing housing is formed by a material which can be subjected to greater loading.

Here, the turbine-side bearing housing flange may be replaced by a separate flange composed of a higher-grade material in relation to the known solution. To realize a reliable connection of the bearing housing to the turbine housing with regard to strength and sealing action at high temperatures, the material for the flange to be mounted separately on the bearing housing is matched in terms of its properties to those of the turbine housing.

Depending on the turbine housing material used, the turbine-housing-side flange may be produced from a high-temperature-resistant ferritic material (for example X22XCrMoV 12-1 (1.4923)) or from an austenitic cast steel (for example GX40MeCrSiNb38-18 (1.4849)).

The subclaims relate to advantageous refinements of the invention.

The connection of the separate turbine-housing-side flange to the bearing housing may be realized by means of screw connections, shrink-fit connections, welded connections, adhesive connections, soldered connections, composite casting or a combination of the above connection types.

The machining of the bearing housing can preferably be carried out in the conventional way after the fixing of the separate flange to the bearing housing.

Figure 3:
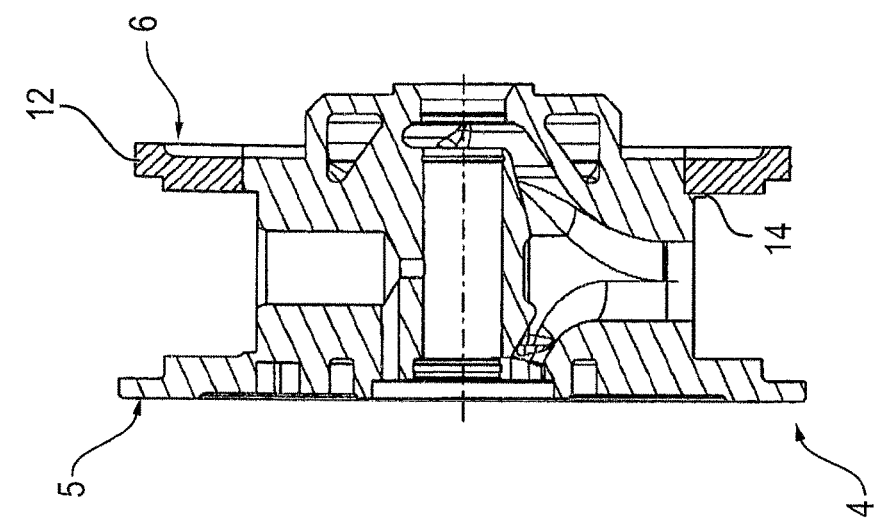
Figure 2:
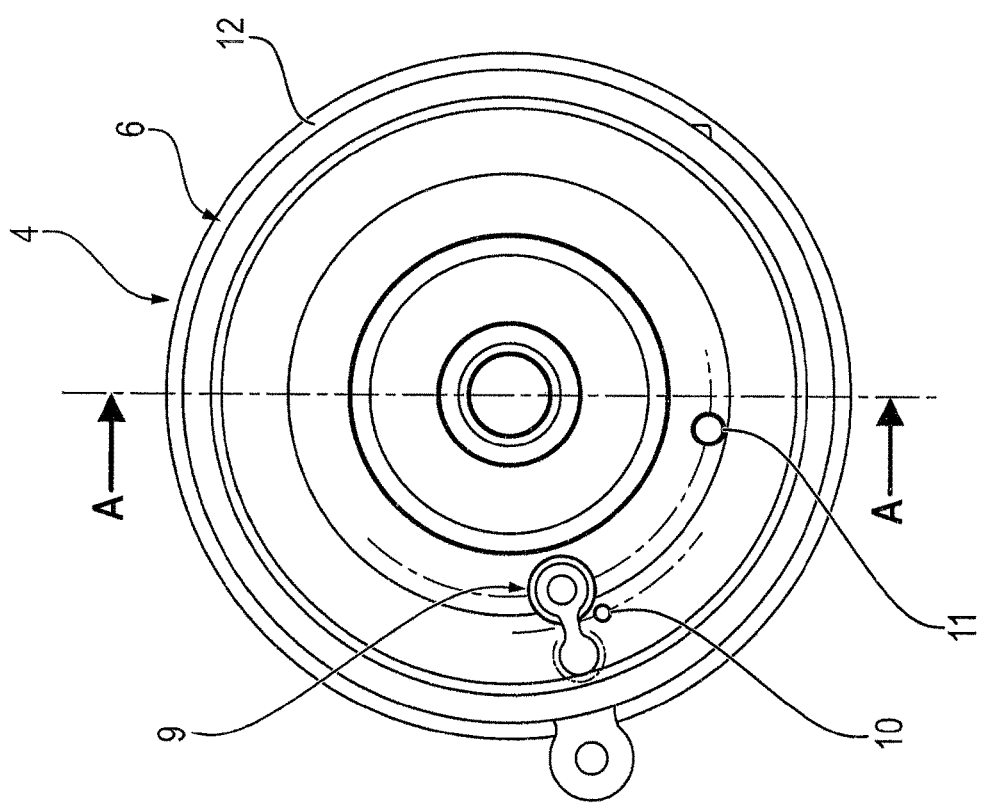
Figure 6:
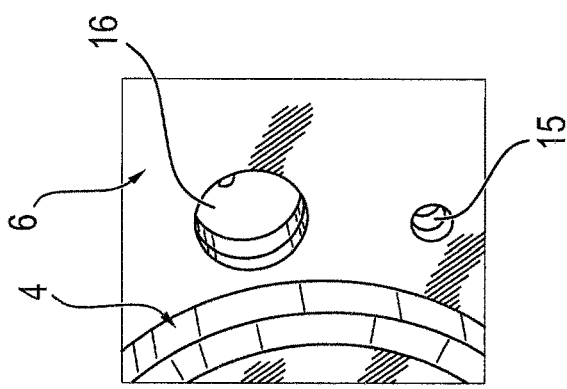
Figure 5:
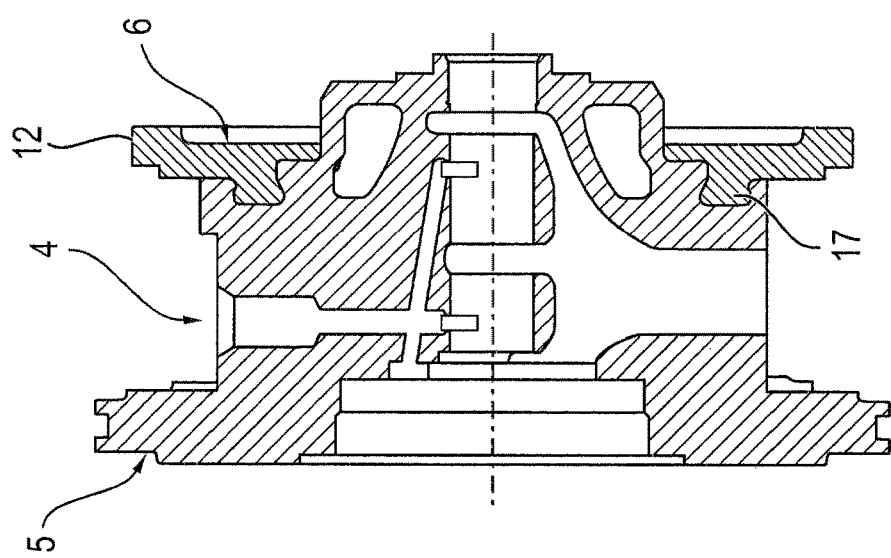
Figure 4:
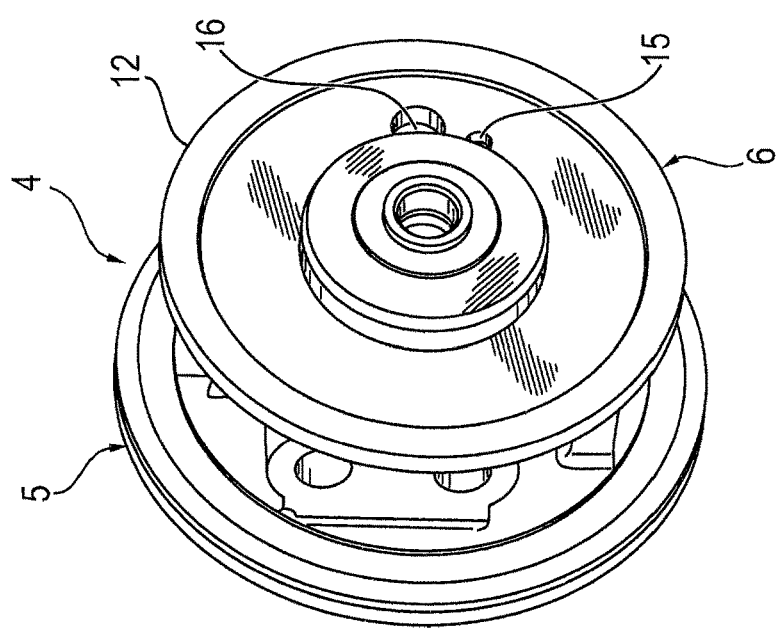
Figure 9:
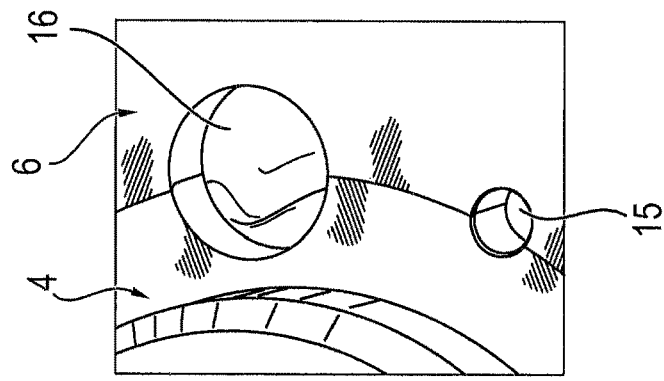
Figure 8:
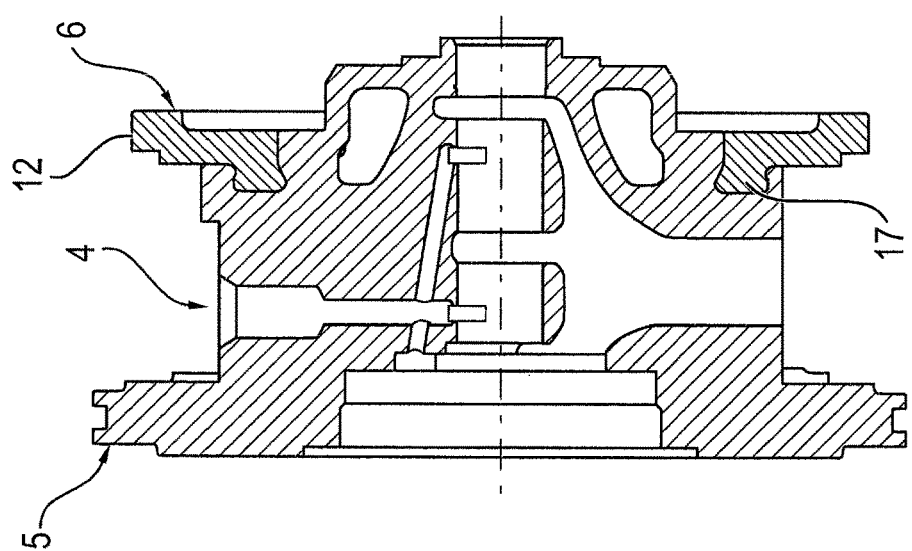
Figure 7:
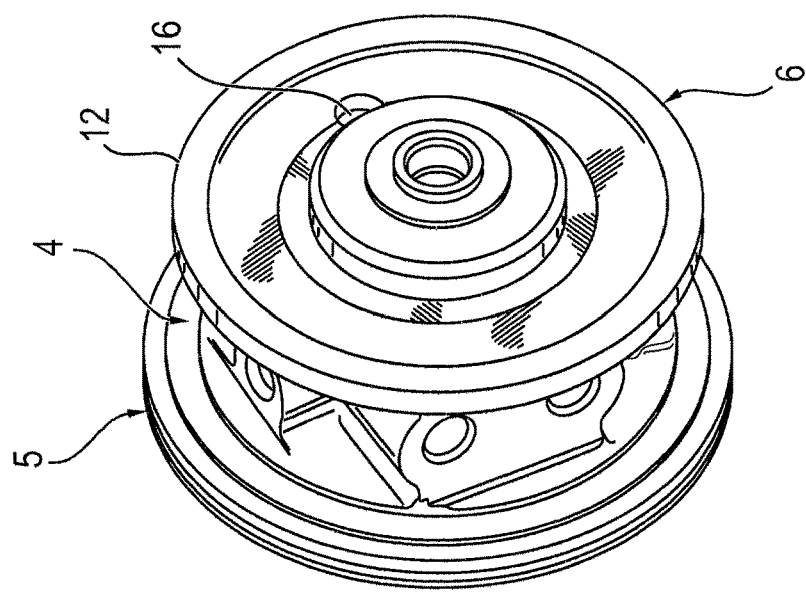
Figure 11:
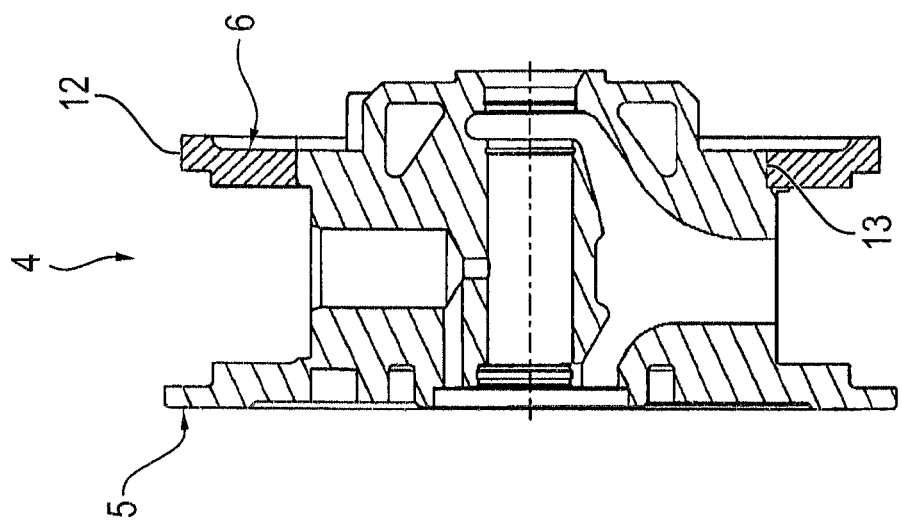
Figure 10:
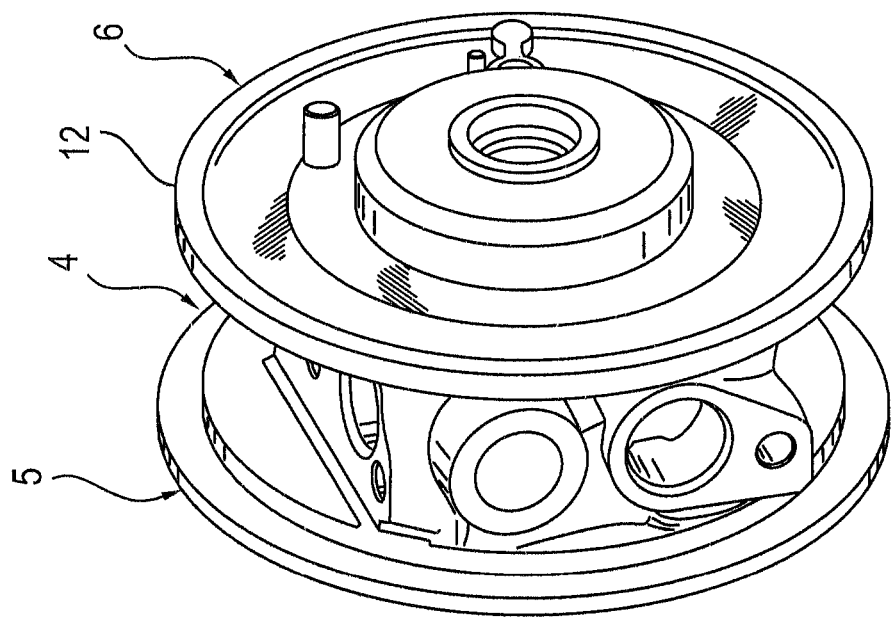

Further details, features and advantages of the invention will emerge from the following description of exemplary embodiments on the basis of the drawing, in which:

FIG. 1 shows a sectional perspective illustration of an exhaust-gas turbocharger according to the invention, FIG. 2 shows a plan view of the bearing housing of the exhaust-gas turbocharger as viewed from the turbine, FIG. 3 shows a section through the bearing housing along the line A-A in FIG. 2, FIG. 4 shows a perspective illustration of a further embodiment of the bearing housing according to the invention, FIG. 5 shows a sectional illustration, corresponding to FIG. 3, of the bearing housing as per FIG. 4, FIG. 6 shows a partial view of the bearing housing as per FIG. 4, FIG. 7 shows an illustration, corresponding to FIG. 4, of a further embodiment of the bearing housing according to the invention, FIG. 8 shows an illustration, corresponding to FIG. 5, of the bearing housing as per FIG. 7, FIG. 9 shows an illustration, corresponding to FIG. 6, of the bearing housing as per FIG. 7, FIG. 10 shows an illustration, corresponding to FIG. 7, of a further embodiment of the bearing housing according to the invention, and FIG. 11 shows an illustration, corresponding to FIG. 8, of the bearing housing as per FIG. 10.

FIG. 1 illustrates an exhaust-gas turbocharger 1 according to the invention which has a compressor 7 and a compressor housing 2.

The exhaust-gas turbocharger 1 also has a turbine 8 with a turbine housing 3 and has a bearing housing 4 which is connected via a compressor-side flange 5 to the compressor 7 and via a turbine-housing-side flange 6 to the turbine 8 or the turbine housing 3.

The design of the turbine-housing-side flange 6 will be explained in detail below on the basis of FIGS. 2 to 11. The exhaust-gas turbocharger illustrated in FIG. 1 self-evidently also has all the other components of such turbochargers, said components however not being described in detail because they are not required for explaining the principles of the present invention.

FIGS. 2 and 3 illustrate a first embodiment of the bearing housing 6 according to the invention of the exhaust-gas turbocharger 1.

The view in FIG. 2 is a view from the direction of the turbine 8, and shows the bearing housing 4 with its turbine-housing-side flange 6, wherein, owing to the selected illustration, it is possible to see an arrangement 9 composed of a bush, a lever and a pin, and also two dowel pins 10 and 11.

FIG. 3 shows that the turbine-housing-side flange 6, which is formed as a separate component, is formed as a steel flange which can be either screwed or welded to the bearing housing 4. The reference numeral 14 symbolically indicates one of the possible weld points of a multiplicity of weld points.

FIGS. 4 to 6 illustrate a further embodiment of the bearing housing 4 according to the invention, wherein all of the features which correspond to FIGS. 2 and 3 are denoted by the same reference numerals.

In said design variant, the flange 6 is cast integrally with the bearing housing 4, wherein FIG. 5 shows that the connection is realized by means of a suitable shaping 17.

FIGS. 4 and 6 furthermore show two recesses 15 and 16 which, in said embodiment, are situated entirely within the surface of the flange 6.

FIGS. 7 to 9 illustrate a further design variant of an integrally cast flange 6, wherein FIG. 8 again shows the form fit 17. Said embodiment otherwise corresponds to the embodiment as per FIGS. 4 to 6, aside from the fact that FIG. 9 shows that the recesses 15 and 16 are situated partially in the material of the flange 6 and partially in the material of the bearing housing 4.

FIGS. 10 and 11 show a variant which substantially corresponds to the embodiment as per FIGS. 2 and 3 and in which the flange 6 is screwed to the bearing housing 4 by means of an internal/external thread 13. The recesses 15 and 16 as per FIG. 9 serve, together with the pressed-in bush 9 or the pressed-in pin 11 (shown in FIG. 2), as a rotation prevention means.

All of the above-explained design variants of the bearing housing 4 according to the invention have in common the fact that the flange 6 is matched in terms of its material properties to the material of the turbine housing 3, such that the problems explained in the introduction, in particular with regard to undesired crack formation in the region of the contact point between the bearing housing 4 and the turbine housing 3, can be eliminated.

In addition to the above written disclosure of the invention, reference is hereby made explicitly to the diagrammatic illustration thereof in FIGS. 1 to 11.

LIST OF REFERENCE NUMERALS

1 Exhaust-gas turbocharger
2 Compressor housing
3 Turbine housing
4 Bearing housing
5 Compressor-side flange
6 Turbine-housing-side flange
7 Compressor
8 Turbine
9 Arrangement composed of bush, lever and pin
10, 11 Dowel pins
12 Circumferential collar
14 Weld point
13 Internal thread/external thread
15, 16 Recesses
17 Connecting device with suitable shaping (form fit) which engages into the bearing housing 4

The invention claimed is:

1. An exhaust-gas turbocharger (1) having
   a compressor housing (2);
   a turbine housing (3) having a bearing-housing-side flange having a planar contact surface; and
   a bearing housing (4)
      which has a compressor-side flange (5) and
      which has a turbine-housing-side flange (6) as a separately produced component which is connected to the bearing housing (4) and has a planar contact surface adapted to mating to the planar contact surface of the turbine housing (3) bearing-housing-side flange,
   wherein
      the turbine housing is formed of a material adapted to withstand exhaust-gas temperatures and thermal variations,
      the turbine-housing-side flange (6) of the bearing housing (4) is produced from steel and the remainder of the bearing housing (4) is produced from iron.

2. The exhaust-gas turbocharger as claimed in claim 1, wherein the turbine-housing-side flange (6) is connected to the bearing housing (4) by means of a screw connection, a shrink fit, welding, adhesive bonding, soldering or composite casting or combinations of these connection types.

3. The exhaust-gas turbocharger as claimed in claim 1, wherein the material of the bearing housing (4) turbine-housing-side flange (6) is a ferritic steel.

4. The exhaust-gas turbocharger as claimed in claim 1, wherein the material of the bearing housing (4) turbine-housing-side flange (6) is an austenitic steel.

5. The exhaust-gas turbocharger as claimed in claim 1, wherein the bearing housing other than the turbine-housing-side flange (6) is a cast part composed of a pearlitic microstructure.

6. A bearing housing (4) for an exhaust-gas turbocharger (1), having a compressor-housing-side flange (5) and a turbine-housing-side flange (6), wherein the bearing housing other than the turbine-housing-side flange (6) is a cast part composed of a pearlitic microstructure, and wherein the turbine-housing-side flange (6) is a separately produced component which is connected to the bearing housing (4) and is produced from a high-temperature-resistant ferritic or from an austenitic cast steel.

7. The bearing housing as claimed in claim 6, wherein the turbine-housing-side flange (6) is connected to the bearing housing (4) by means of a screw connection, a shrink fit, welding, adhesive bonding, soldering or composite casting or combinations of these connection types.

* * * * *